Nov. 1, 1966 E. McALPINE 3,283,106
ELECTRICAL CONTACT ELEMENTS
Filed March 2, 1965

Inventor
Ernest McAlpine
By Jacobs & Jacobs
Attorneys

United States Patent Office 3,283,106

Patented Nov. 1, 1966

3,283,106

ELECTRICAL CONTACT ELEMENTS

Ernest McAlpine, Bill Quay, England, assignor to Burgess Products Company Limited, Hinckley, England, a company of Great Britain and Northern Ireland Filed Mar. 2, 1965, Ser. No. 436,566

Claims priority, application Great Britain, Mar. 5, 1964, 9,350/64

8 Claims. (Cl. 200—166)

This invention relates to electrical apparatus wherein a first of two conductive components is required to be mounted on a second of said components so as to provide an uninterrupted conductive path between them and so that the first component may pivot relatively to the second. The pivoting movement may be due to the inherent resiliency of the first component or due to a bearing action between the components, and in either case it will be appreciated that the first component must be held located on the second. An example of such electrical apparatus is a microswitch having a movable contact engageable with one or more fixed contacts, the movable contact being carried on one end of an arm having at its other end a knife edge by way of which the arm is pivotally mounted in a notch formed in a support, the support and movable contact being made of conductive material.

In previous constructions, a common way of mounting a resilient first component on the second was by riveting to provide the current path between the two components, or to hold them in conducting relationship. It was later found that it was advantageous to form a knife edge on the first component and seat this in a notch in the second component, the knife edge obviously permitting the required pivoting action. Generally speaking, the knife edge bears sufficiently well against the notch so that the resistance of the bearing is such that efficient current flow between the components is ensured.

It has been found that the resistance can be lowered if the surface of the notch is of a precious metal, for example, platinum, palladium, rhodium or gold, or more commonly silver, and this has in the past been achieved by plating of the second component. Obviously plating is only required in the region of the notch, and in order to economise on plating metal it is necessary to use conventional masking techniques so that only the notch part is exposed to the plating solution. This masking, however, due to the difficulty of masking on a small scale, is very time consuming, and it may be found cheaper, but still not economic, to plate the whole component.

A disadvantage of plating the second component is that the layer of precious metal in the notch is quite thin, usually between 0.2 and 0.5 thousandths, and the action of the knife edge in the notch as the first component pivots, rapidly wears away the precious metal layer so that the resistance of the bearing is again increased.

According to the present invention electrical apparatus includes a first electrically conductive component formed with a knife edge pivoted in a notch in a second electrically conductive component, the second component being formed from a strip of non-precious conductive metal carrying on one surface thereof a fillet of precious metal and being shaped so that the surface of the fillet forms the surface of the notch that the knife edge bears against.

The knife edge thus bears against precious metal and the resistance of the bearing is therefore low so that efficient current flow between the components is ensured. The quantity of precious metal used in a construction according to the invention is substantially lower than the quantity necessary for a similar construction if the whole of the second component is plated, so leading to a reduction in cost. Furthermore the thickness of the fillet can be substantially greater than that of a plated layer, while still using less of the precious metal, so that the knife edge will take correspondingly longer to wear through the precious metal.

The fillet can either be inlaid in a recess in the surface of the non-precious metal, or onlaid on to the surface of the non-precious conductive metal.

The invention is particularly applicable to use in microswitches, and an example of a microswitch embodying the invention, together with other possible component arrangements, will now be described in more detail with reference to the accompanying drawings in which.

Figure 1:
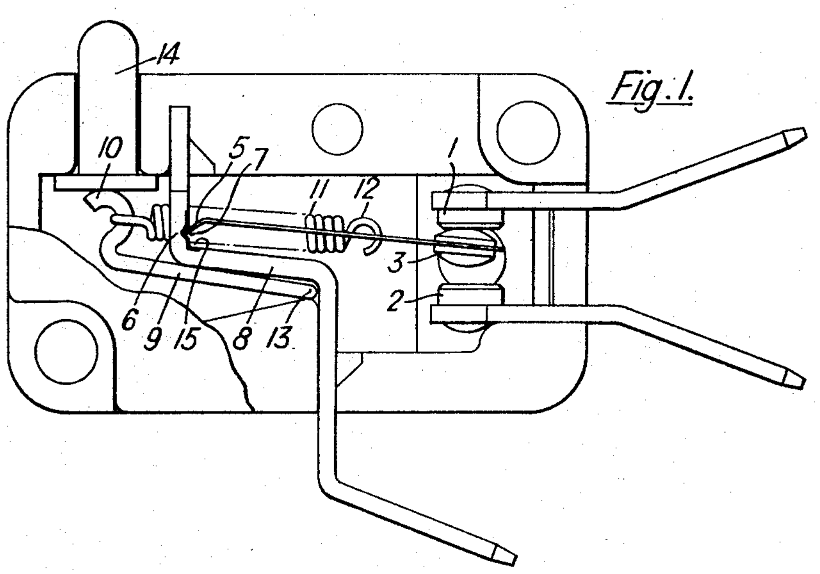
FIGURE 1 is a side elevation of a microswitch.

The microswitch shown in FIGURE 1 comprises two fixed contacts 1 and 2, either of which may be engaged by a movable contact 3 carried on one end of an arm 4. The arm is formed as a strip of conductive metal having an end 5 remote from the contact 3 bent out of the plane of the arm so that the corner nearest the plane of the arm projects away from the contact to form a knife edge 6. The knife edge is received in a notch 7 in a supporting member 8, this member being formed of a non-precious conductive metal. The notch has an inlay of precious metal, more particularly silver, and the bottom of the notch is flattened slightly to allow the knife edge a reasonable area of possible contact. The inlay of precious metal is extended round the concave corner 15 of the support 8, so that there is little danger of one end of the inlay lifting from the recess in the support in which it is received.

The switch also includes a lever 9 having a hook 10 at one end which carries one end of a tension spring 11 fixed at its other end 12 to the arm 4. The lever 9 is pivotally mounted at its end 13 and an operating button 14 can act on the hook 10 of the lever. When the button 14 is depressed it will be seen that the center line of the spring 11 moves from above the knife edge 6 of the arm to below the knife edge, and the arm therefore changes its position to engage the lower fixed contact 2. The changing position of the arm is, of course, a pivotal movement allowed by the knife edge 6 in the notch 7.

It will be appreciated that this figure shows only one particular form of microswitch, but it will be readily apparent that the invention is also applicable to any other microswitch where a movable arm is pivotally mounted on a support by a knife edge engaging in a notch. The support may, of course be of any shape suitable for that particular switch, and in some cases may itself form an arm for a second movable contact, each arm being formed with a knife edge bearing in a notch formed as an inlay of precious metal in the other arm.

Figure 2:
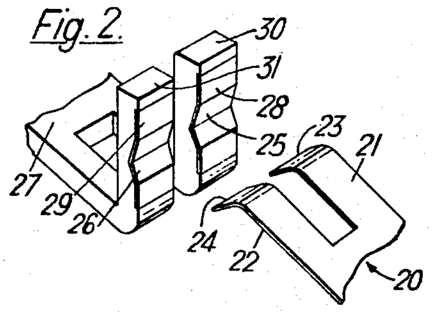
FIGURE 2 is an exploded perspective view of two components according to the invention.

It will be further understood that either or both of the first and second electrically conductive components may be bifurcated. An example of this is shown in FIGURE 2 wherein a movable contact 20 is bifurcated to have two arms 21 and 22 presenting respectively knife edges 23 and 24. These knife edges are received in notches 25 and 26 in a support 27, the surfaces of the notches being formed by the surface of precious metal inlays 28 and 29 received in recesses in the two arms 30 and 31 of the support, which is formed generally of non-precious metal.

Figure 3:
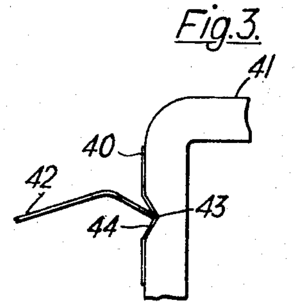
FIGURE 3 is a side elevation of an alternative arrangement of two components according to the invention.

FIGURE 3 illustrates the use of an onlay 40 of precious metal, rather than an inlay of such metal. The onlay is applied to the surface of the non-precious conductive metal support 41, and a pivotally movable component 42 has a knife edge 43 received in a notch 44 having a surface of precious metal.

Manufacture of the member with the inlay or onlay is straight forward. A strip of precious metal such as platinum, palladium, rhodium, gold or silver is first inlaid in, or onlaid on, and bonded to a sheet of backing metal such as brass, copper, beryllium-copper, nickel-silver or phosphor-bronze, the thickness of the inlay or onlay being in the range 1 to 3 thousandths. The sheet can then be cut across the strip of precious metal into strips each bearing an inlay or onlay of the precious metal. One such strip is then pressed to the required shape and is subsequently notched by indentation in the region of the inlay or onlay. This operation has a work-hardening effect on the precious metal and this increases its resistance to wear from the knife edge. This, together with the relatively great thickness of the precious metal, ensures that efficient conduction will take place at the pivot for a period of time much longer than that over which any previous construction operates efficiently.

What I claim and desire to secure by Letters Patent is:

1. Electrical apparatus including first and second electrically conductive components, a knife edge and a notch formed on said first and second components respectively, the knife edge being pivoted in the notch, the second component being formed from a strip of non-precious conductive metal, a fillet of precious metal being carried on one surface thereof, said fillet being shaped so that a surface of the fillet forms the surface of the notch that the knife edge bears against.

2. Electrical apparatus in the form of a microswitch having a movable contact engageable with one or more fixed contacts, an arm carrying on one end the movable contact and a knife edge formed on the other end of the arm, a support for the arm, a notch formed in the support to receive the knife edge and pivotally mount the arm, the support being of non-precious conductive metal and a fillet of precious metal being carried on one surface thereof, said fillet being shaped so that a surface of the fillet forms the surface of the notch that the knife edge bears against.

3. Electrical apparatus according to claim 2 in which the fillet is inlaid in a recess in the surface of the non-precious conductive metal.

4. Electrical apparatus according to claim 2 in which the fillet is onlaid on to the surface of the non-precious conductive metal.

5. Electrical apparatus according to claim 2 in which the thickness of the fillet is in the range of from 1 to 3 thousandths of an inch.

6. Electrical apparatus according to claim 2 in which the base of the notch is flattened slightly.

7. Electrical apparatus according to claim 1 in which the thickness of the fillet is in the range of from 1 to 3 thousandths of an inch.

8. Electrical apparatus according to claim 1 in which the base of the notch is flattened slightly.

References Cited by the Examiner

UNITED STATES PATENTS

| | | | |
|---|---|---|---|
| 2,508,040 | 5/1950 | Ransome | 200—67 X |
| 2,513,804 | 7/1950 | Kaminky | 200—67 X |
| 2,754,393 | 7/1956 | Clair | 200—166 |
| 2,932,880 | 4/1960 | Gellatly et al. | 200—166 X |
| 3,075,281 | 1/1963 | Spooner | 200—166 |
| 3,164,708 | 1/1965 | Theobald | 200—166 |

ROBERT K. SCHAEFER, *Primary Examiner.*

ROBERT S. MACON, *Examiner.*

H. O. JONES, *Assistant Examiner.*